(12) United States Patent
Kikuchi

(10) Patent No.: US 6,828,402 B2
(45) Date of Patent: Dec. 7, 2004

(54) RESIN COMPOSITE, METHOD FOR PRODUCING THE SAME AND ARTICLES CONSISTING OF THE SAME

(75) Inventor: Yoshihiko Kikuchi, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 441 days.

(21) Appl. No.: 09/976,103

(22) Filed: Oct. 15, 2001

(65) Prior Publication Data

US 2002/0065344 A1 May 30, 2002

(30) Foreign Application Priority Data

Oct. 17, 2000 (JP) ........................ 2000-316089

(51) Int. Cl.[7] .................. C08G 63/66; C08G 18/00
(52) U.S. Cl. .................. 527/301; 527/311; 528/48; 528/74.5; 528/300; 193/37
(58) Field of Search ................ 527/301, 311; 528/48, 74.5, 300

(56) References Cited

U.S. PATENT DOCUMENTS 5,270,421 A * 12/1993 Dordick et al. ............. 527/311

FOREIGN PATENT DOCUMENTS

| EP | 0 987 284 A1 | 3/2000 |
| GB | 0 260 138 A | 4/1993 |
| WO | WO 96/05238 | 2/1996 |

OTHER PUBLICATIONS

Abstract of JP 6–128348 (May 10, 1994).
Abstract of JP 5–186556 (Jul. 27, 1993).
Abstract of JP 10–324729 (Dec. 8, 1998).
Abstract of JP 2000–143702 (May 26, 2000).
M.M. Lynn et al., "Synthesis and Biodegradability of Amylose Block Copolymers," 19(2) *Polymer Reprints, Am. Chem. Soc., Div. Polym. Chem.* 106–110 (1978).
European Search Report in Appln No. 01124606.3.

* cited by examiner

*Primary Examiner*—Tae H. Yoon
(74) *Attorney, Agent, or Firm*—Fitzpatrick, Cella, Harper & Scinto

(57) ABSTRACT

A resin composite characterized in that it includes: a polymer compound which is an alternating copolymer of a saccharic compound and an aliphatic compound and has a three-dimensional network; and a plasticizer contained in the gap in the three-dimensional network of the above polymer compound, the production of the resin composite contributing to making good use of waste vegetable resources, such as used paper and waste molasses, as raw materials, the resin composite having elasticity and flexibility just as does rubber.

8 Claims, No Drawings

RESIN COMPOSITE, METHOD FOR PRODUCING THE SAME AND ARTICLES CONSISTING OF THE SAME

BACKGROUND OF THE INVENTION

1. Field of the Invention

The present invention relates to a resin composite produced using waste resources, such as used paper and waste molasses, as raw materials and capable of being utilized as a plastic material, a method for producing the same, and articles consisting of the same.

2. Related Background Art

In Japan, which has not been rich in forest resources, collecting/recycling used paper have been carried out positively and a system has been firmly established in which used newspaper, used corrugated fiberboard and the like are reused as recycled paper. However, for copying paper and printing paper of which consumption has rapidly increased recently as copiers and printers have become in common use by leaps and bounds, the utilization of used paper for their production is low. Furthermore, since recycling of paper is basically carried out stepwise from the higher quality paper downward, there is a limit to the demand of used paper, on the whole, unless the present situation changes. The waste paper tends to increase more and more with the progress toward office automation (OA), and the increase in the excess used paper has become one of the current issues related to waste. Accordingly, utilizing used paper by transforming it into something other than recycled paper is very meaningful, in particular, transforming it into a plastic material is desirable because it can have wide applications.

Waste resources, other than used paper, derived from vegetables include, for example, lees produced during the pressing process of sugar manufacturing and brewing and waste molasses left after the refining process of sugar manufacturing. The waste molasses is not always suitable for foods because it contains indigestible saccharides. Some of the compounds obtained by the chemical modification of polysaccharides, which are vegetable polymers as described above, can be plastic materials; however, their properties lack in diversity and there are none known as substitute materials for rubber.

SUMMARY OF THE INVENTION

Accordingly, the primary object of this invention is to provide a resin composite, which can be a useful material having elasticity and flexibility just as does rubber, by making good use of waste vegetable resources such as used paper and waste molasses, a method of producing the above resin composite, and articles consisting of the same.

The invention achieving the above object is a resin composite characterized in that it includes: a polymer compound which is an alternating copolymer of a saccharic compound and an aliphatic compound and has a three-dimensional network; and a plasticizer contained in the gap in the three-dimensional network of the above polymer compound.

Further, the invention is a method of producing the above resin composite characterized in that it includes: a step of providing a liquid containing a plasticizer; and a step of copolymerizing a saccharic compound and a aliphatic compound in the above liquid.

The preferable applications of the above articles include, for example, a shock absorbing medium and a recording medium conveying roller for a printer.

DETAILED DESCRIPTION OF THE PREFERRED EMBODIMENTS

In the following this invention will be described in detail in terms of its preferred embodiments.

When considering how to make good use of used paper, the inventors of this invention noted that cellulose, a main component of paper, and amylose, amylopectin, main components of starch and so forth, are all polymers of glucose, and they finally found that used paper and starch can be transformed into polymer compounds by copolymerizing saccharic compounds (glucose, oligosaccharides, etc.), which are obtained by chemically decomposing cellulose and the like, and bi-functional aliphatic derivatives having almost the same number of carbons as that of the saccharic rings. According to the above method, the backbone structure of the saccharic polymers as raw materials is altered, and therefore, the physical properties of the same can be substantially changed. Further, according to the above method which involves chemical decomposition of saccharic polymers as raw materials, monosaccharides and oligosaccharides can be obtained selectively while separating water-insoluble impurities; thus, the above method is very effective in making good use of used paper of low quality, which is difficult to recycle, lees produced during the pressing process of vegetable resources and so forth.

And after conducting many times a further investigation of polymer compounds having saccharides in their backbone structures as described above, the inventors found that, when a plasticizer-like component, that is, a nonvolatile low-molecular-weight or polymer compound with a flexible middle- or long chain is introduced into the three-dimensional network having been formed by the above polymer compounds being branched and crosslinked in their saccharic moieties, the polymer compounds obtained are resin composites exhibiting satisfactory elasticity and flexibility just as does rubber, and they finally have made this invention. Specifically, molded forms consisting of the resin composites of this invention can be produced using used paper, waste molasses and so forth as raw materials; accordingly, the production of such molded forms contributes to making good use of waste vegetable resources. Further, molded forms consisting of the resin composites of this invention have properties which allow the molded forms to be used as substitutes for the existing rubber materials; accordingly, they can be used over a wide range and their application can be expected to expand.

(Constitution and Production Method)

The saccharic compounds used in the resin composites of this invention are preferably glucose and oligosaccharides consisting of glucose units (obtained by dehydrating and condensing several monosaccharides through glycoside linkage); however, they may be other monosaccharides (mannose, galactose, etc.) and oligosaccharides containing the same, and moreover, the linkage types (α, β) of oligosaccharides are not necessarily limited. For oligosaccharides, hexasaccharide or oligosaccharides of which polymerization degree is less than 6 are desirably used. The use of heptaoligosaccharide or oligosaccharides of which polymerization degree is more than 7 causes the intended polymer compounds to be harder, which in turn may cause the molded forms consisting of the polymer compounds to lack in flexibility. The saccharic compounds may also be used in which alkyl groups, acyl groups, etc. are substituted for part of the hydroxyl groups thereof.

The bi-functional aliphatic compounds copolymerized together with the above described saccharic compounds in the production of the resin composites of the present invention include, for example, aliphatic dicarboxylic acids, aliphatic dicarboxylate esters, aliphatic dicarboxylic acid chlorides and aliphatic diisocyanates.

The components suitably used as a plasticizer include, for example, silicone oil, modified silicone oil, paraffin (solid paraffin, liquid paraffin) and derivatives of fatty acids. When using the resin composite in applications which do not require high resistance to water, polyalkylene glycols such as polyethylene glycol can be used as a component as a plasticizer.

The above described fatty acid derivatives used as a plasticizer include, for example, monocarboxylic acids having 8 to 18 carbon atoms, dicarboxylic acids and the esters thereof; however, these examples are not intended to limit this invention. When these fatty acid derivatives are aliphatic dicarboxylic acids having the same acid radical as that of the fatty acid moiety which constitute the polymer compounds as a backbone or the esters thereof, they are highly useful because the intended resin composites can be obtained simply and easily only by using an excess amount of precursors of the fatty acids (or by using a reduced amount of saccharic compounds), and hence preferable. Further, esters such as oleic acid triglyceride, which is a main component of food oil, and the fatty acids obtained by saponifying the above esters can also be used. This indicates that this invention is very useful as means for recycling waste food oil.

The resin composites of this invention can be synthesized easily using the above described components and the methods described below.

First, a polymer compound having a crosslinked structure is prepared by copolymerizing a saccharic compound and a bi-functional aliphatic derivative in a solution containing a plasticizer, if necessary, in the existence of a proper catalyst. At the time of this preparation, the plasticizer and the solvent are introduced into the gap in the three-dimensional network which consists of the polymer compound to be formed, and a gel is formed. Then the solvent and the disused are removed from the obtained gel by cleaning, drying, or other methods, to obtain the intended resin composite. Alternatively, the intended resin composite can be obtained by synthesizing the above polymer compound at lower molecular weight which has reactive terminals (for example, acid terminals) in advance, kneading the low-molecular-weight polymer with the above plasticizer, and crosslinking the same by heating etc.

After the intensive investigation, the inventors found that, when forming the resin composite of the invention by copolymerizing a saccharic compound and a bi-functional aliphatic derivative, in order to allow the resin composite to crosslink so as to have properties just as rubber, it is effective to use the bi-functional aliphatic derivative in excess of an amount that the saccharic compound requires. The inventors also found that in addition to the above method, the proper use of a poor solvent for the polymer compound as a copolymer allows the optimal crosslinking to be easily derived. The poor solvents usable in such a case include, for example, acetonitrile, toluene, xylene and dioxane. These poor solvents can be used in combination with, for example, N,N-dimethylformamide, which is a good solvent. As solvents used, desirably those making the dissolution and dispersion of a plasticizer satisfactory are properly selected and used in combination with each other.

Additives, such as coloring material, stabilizer and filler, may be added to the resin composite of this invention, according to its application.

Since the resin composite of this invention which is obtained as described above can be bound by heating and pressing, rubber-like molded form in a desired form can be obtained through, for example, compression molding in a die. Further, since the obtained molded form can be cut with a cutter, the resin composite after molding forming can be made into various products by machining it in a desired form.

The molded form consisting of the resin composite of this invention has elasticity and flexibility similar to those of the known rubber materials and causes a deformation in itself when pressure is applied thereto and recovers when the pressure is relaxed; therefore, it is suitably used for a shock absorbing medium or for conveying and pressing rollers.

(Saccharification by Decomposition)

When utilizing used paper and vegetable lees produced during the pressing process of vegetables, as raw materials, if the used paper and the vegetable lees are chemically decomposed, β1→4 linkage of cellulose contained in them as a constituent is cut off, and glucose (monosaccharide) and cellooligosaccharides (di-to hexasaccharides) can be obtained as water-soluble components. The concrete processes of such saccharification by decomposition include, for example, decomposition with acids such as dilute hydrochloric acid and dilute sulfuric acid, decomposition with enzymes such as cellulase and decomposition with high temperature and pressure water. When utilizing starch or starch molasses as a raw material, the same processes as above are used. From the above raw materials, that is, used paper, vegetable lees produced during the pressing process, starch or starch molasses, various types of glucoses and maltooligosaccharides such as maltose (disaccharide) are obtained through the above described types of decomposition. In decomposition with enzymes, amylase etc. is used.

The polymer compounds constituting the resin composite of this invention are polyesters obtained by the ester reaction of saccharic compounds as polyhydric alcohols with bi-functional aliphatic compounds; therefore, they can be depolymerized through the hydrolytic cleavage of the ester linkage and provide saccharides and fatty acids as decomposition products. This indicates that, in the resin composite of this invention which consists of the above described polymer compounds, its molded forms and the waste thereof can be reused as the raw material. For the hydrolysis in the above cases, aqueous solution of sodium hydroxide or enzymes such as lipase and esterase are preferably used.

In the following the present invention will be described in further detail taking examples and comparative examples.

EXAMPLE 1

System Containing Silicone Oil 10 g of glucose, 10 ml of silicone oil (SRX310, by Dow Corning Toray Silicone) and 30 ml of pyridine were mixed into 200 ml of dioxane, and the mixture was heated to 70° C. in the nitrogen atmosphere while being agitated vigorously. Then 20 ml of sebacic acid chloride diluted with 100 ml of N, N-dimethylformamide was added dropwise to the mixture, and the mixture was agitated for 30 minutes to undergo copolymerization. The formed gel was water-washed three times and dried, to remove the solvent and the disused therefrom, as a result of which 18 g of colorless, rice cake-like solid, which was the resin composite of this example, was obtained.

EXAMPLES 2 to 6

A resin composite was synthesized in the same manner as Example 1, except that the raw material components were replaced with those shown in Table 1. As a result, a colorless or slightly yellowish rice cake-like solid was obtained in each example.

TABLE 1

Raw Material Components used in Examples 2 to 6

| Example | Saccharic Compound | Bi-functional Aliphatic Derivative | Plasticizer |
|---|---|---|---|
| 2 | Glucose | Azelaic Acid Chloride | Silicone Oil (the same as that of Example 1) |
| 3 | Glucose | Hexamethylene diisocyanate | Silicone Oil (the same as that of Example 1) |
| 4 | Glucose | Sebacic Acid Chloride | Bulk Paraffin |
| 5 | Glucose | Sebacic Acid Chloride | Salad Oil |
| 6 | Maltose | Sebacic Acid Chloride | Liquid Paraffin |

EXAMPLE 7
System Containing an Excess of Fatty Acid 5 g of glucose and 30 ml of pyridine were mixed into 200 ml of acetonitrile, and the mixture was heated to 70° C. in the nitrogen atmosphere. Then 20 ml of sebacic acid chloride diluted with 100 ml of N, N-dimethylformamide was added dropwise to the mixture, and the mixture was agitated for 30 minutes to undergo copolymerization. The formed gel was immersed in water for 12 hours, and then washed and dried, as a result of which 12 g of colorless, rice cake-like solid, which was the resin composite of this example, was obtained.

EXAMPLE 8
Resin Synthesis from Used Paper

Corrugated fiberboard (double-sided, A-flute) was cut into 5-mm squares. 100 g of the corrugated fiberboard squares were put into 3 l of an enzyme solution, and the solution was agitated at 45° C. for 6 hours to undergo enzymatic decomposition. In this enzymatic decomposition, 10 g of cellulase (Meicelase TP60, by Meiji Seika Kaisha, Ltd.) dissolved in 3 l of acetic acid/sodium acetate aqueous solution (pH 4.5) was used as the enzyme solution. After the completion of the reaction, 200 ml of methanol was added to the solution, the insoluble residue was filtered out, the filtrate was passed through an ion-exchange resin column (Amberite IR-120B, by Japan Organo Co., Ltd.) 50 cm long, and the solvent was distilled out of the filtrate, which underwent drying. As a result, 64 g of slightly yellowish powder, which was a saccharic mixture having glucose, cellobiose, cellotriose as main components, was obtained.

50 g of the saccharic mixture was copolymerized with sebacic acid chloride in the same manner as Example 1 and the copolymer was allowed to contain silicone oil; thus, 55 g of slightly brown solid, which was the resin composite of this example, was obtained.

EXAMPLES 9 and 10
Method using Kneading/Post Crosslinking 5 g of glucose, 2 g of adipic acid and 6 ml of acetic anhydride were mixed together, and the mixture was agitated at 120° C. for 1 hour. Then 0.5 g of zinc chloride was mixed into the mixture, followed by agitation at a reduced pressure of 6.7 kPa. After 1 hour, 2 g of additional adipic acid was mixed into the mixture, again followed by agitation at a reduced pressure of 6.7 kPa. The obtained paste was put into water and washed while being crushed, as a result of which 8 g of brown powder was obtained. Then 2 g of polyethylene glycol (number average molecular weight of 600) and 2 g of amino-modified silicone oil (TSF4703, by Toshiba Silicone Co., Ltd.) are added to 2 g of the above powder separately taken, respectively. Each mixture was kneaded at 120° C., and heated while being left stand for 1 hour. As a result, a rubber-like solid was obtained from each mixture.

EXAMPLES 11 to 20
Molding

Rice cake-like solids (1 g each) obtained in Examples 1 to 8 were compression molded at 180° C., 2 MPa using a cylindrical die (cylindrical shape, inside dimension, 2 cm in diameter, 3 mm in depth). As a result, a dense molded form having both elasticity and flexibility was obtained in each case.

EXAMPLE 21
Shock Absorbing Medium 120 g of rice cake-like solid was synthesized in the same manner as obtaining the resin composite of Example 1. The obtained rice cake-like solid was stretched out on a hot plate at 180° C. to put it in a string form and then cut into about 5-mm lengths, to prepare a shock absorbing medium in the pellet form.

EXAMPLE 22
Roller 50 g of rice cake-like solid obtained in Example 7 was compression formed (180° C., 3 MPa, using no die) to put it in a sheet form 20 cm long×20 cm long×1 mm thick, wound around and pressed on an aluminum pipe (2 cm in diameter) while being kept on the heated hot plate, and then quenched, to prepare a recording medium conveying roller for an ink jet printer.

As described so far, this invention provides a resin composite of which production contributes to making good use of waste vegetable resources, such as used paper and waste molasses, as raw materials, and moreover, which itself can be a useful material because it has properties of elasticity and flexibility just as rubber and is expected to have wide applications. Further, this invention provides: a method of producing the above resin composite; a molded form consisting of the above resin composite; and a shock absorbing medium and a roller obtained by processing the above molded form.

What is claimed is:

1. An article comprising:
   a resin composite as a main body, wherein the resin composite is a polymer compound, which is an alternating copolymer of a saccharic compound and an aliphatic compound and which has a three-dimensional network; and
   a plasticizer, which is contained in the gap in the three-dimensional network of the polymer compound,
   wherein the article is a recording medium conveying roller.

2. The article according to claim 1, wherein the saccharic compound is at least one selected from the group consisting of glucose, oligosaccharide consisting of 2- to 6-mers of glucose and alkyl or acyl derivatives thereof.

3. The article according to claim 2, wherein the glucose, the oligosaccharide consisting of 2- to 6-mers of glucose and the alkyl or acyl derivatives thereof are obtained by decomposing paper.

4. The article according to claim 2, wherein the glucose, the oligosaccharide consisting of 2- to 6-mers of glucose and the alkyl or acyl derivatives thereof are obtained by decomposing starch.

5. The article according to claim 1, wherein the aliphatic compound is any one selected from the group consisting of aliphatic dicarboxylic acid, aliphatic dicarboxylate ester, aliphatic dicarboxylic acid chloride and aliphatic diisocyanate.

6. The article according to claim 1, wherein the plasticizer is at least one selected from the group consisting of silicone oil, modified silicone oil, polyalkylene glycol, paraffin and ester derivatives of a fatty acid.

7. The article according to claim 6, wherein the ester derivatives of the fatty acid are aliphatic dicarboxylic acids having the same acid radicals as those of the fatty acid moieties of the polymer compound, which is an alternating copolymer of the saccharic compound and the aliphatic compound, or esters thereof.

8. The article according to claim 6, wherein the ester derivatives of the fatty acid are obtained from food oil.

* * * * *